(12) United States Patent
Monk (10) Patent No.: US 10,546,287 B2
(45) Date of Patent: Jan. 28, 2020

(54) CLOSED SYSTEM PROCESSING CONNECTION

(71) Applicant: Visa International Service Association, San Francisco, CA (US)

(72) Inventor: Justin T. Monk, Parker, CO (US)

(73) Assignee: Visa International Service Association, San Francisco, CA (US)

( * ) Notice: Subject to any disclaimer, the term of this patent is extended or adjusted under 35 U.S.C. 154(b) by 818 days.

(21) Appl. No.: 13/888,873

(22) Filed: May 7, 2013

(65) Prior Publication Data
US 2013/0297511 A1 Nov. 7, 2013

Related U.S. Application Data

(60) Provisional application No. 61/643,751, filed on May 7, 2012.

(51) Int. Cl.
*G06Q 20/28* (2012.01)
(52) U.S. Cl.
CPC .................. *G06Q 20/28* (2013.01)
(58) Field of Classification Search
CPC ......... G06Q 20/00; G06Q 30/00; G06Q 40/00
See application file for complete search history.

(56) References Cited

U.S. PATENT DOCUMENTS 6,000,608 A * 12/1999 Dorf .................... G06Q 20/341
235/375

8,650,121 B2 * 2/2014 Spear ................. G06Q 10/0875
705/39
8,733,637 B1 * 5/2014 Cedeno .................. G06Q 30/02
235/380
2007/0276753 A1 11/2007 Bleser et al.
(Continued)

FOREIGN PATENT DOCUMENTS

JP           10-091740 A    4/1998
JP           11-224312 A    8/1999
KR     10-2006-0028070 A    3/2006

OTHER PUBLICATIONS

Riell, Howard; "Weighing Open-Loop Cards", Oct. 2016, Convenience Store Decisions, vol. 27 Issue 10, p. 114-116 (Year: 2016).*

(Continued)

*Primary Examiner* — Bruce I Ebersman
*Assistant Examiner* — David P Sharvin
(74) *Attorney, Agent, or Firm* — Kilpatrick Townsend & Stockton LLP (57) ABSTRACT

In one embodiment of the invention, a method is described. The method comprises receiving at a server computer, an authorization request message from a first merchant computer operated by a first merchant that includes information associated with a transaction conducted by a consumer using a prepaid device associated with a second merchant, determining, based on the information in the authorization request message, the second merchant associated with the prepaid device, transmitting the authorization request message to a second merchant computer operated by the second merchant, receiving an authorization response message from the second merchant computer, and sending the authorization response message to the first merchant computer.

21 Claims, 6 Drawing Sheets

(56) References Cited

U.S. PATENT DOCUMENTS

2009/0327087 A1    12/2009  Beek et al.
2010/0161405 A1*  6/2010  Cervenka ............. G06Q 20/023
                                                             705/14.38
2012/0290368 A1* 11/2012  Im ...................... G06O 30/0229
                                                             705/14.3

OTHER PUBLICATIONS

International Search Report and Written Opinion, dated Sep. 23, 2013, for PCT Application PCT/US2013/039956, 11 pages.

\* cited by examiner

FIG. 1

|  | Column A | Column B | Column C | Column D |
|---|---|---|---|---|
|  | Current Value of Giftcard | Giftcard Account Number | Issuing Merchant ID | Surcharge Fee |
| Gift Card 1 (Row 1) | $150 | 123456 | 3729 (Applebee's) | Consumer charged fixed $5, no charge to transaction or issuing merchant |
| Gift Card 2 (Row 2) | $50 | 123457 | 9038 (Sears) | Consumer charged 10% fee, transaction merchant charged 5% |
| Gift Card 3 (Row 3) | $35.50 | 123458 | 1048 (Starbucks Coffee) | No fee charged to consumer, transaction merchant charged 10% fee |
| Gift Card 4 (Row 4) | $25 | 123459 | 6502 (Best Buy) | Consumer charged 5%, transaction merchant charged 5% |

A surcharge of $5 will be added to the transaction amount

| Accept Surcharge | Reject Surcharge |

FIG. 6A

A surcharge of $5 will be added to transaction amount, reply "A" to accept and "C" to cancel

FIG. 6B

CLOSED SYSTEM PROCESSING CONNECTION

CROSS-REFERENCES TO RELATED APPLICATIONS

The present application is a non-provisional application of and claims priority to U.S. Provisional Application No. 61/643,751, filed on May 7, 2012, the entire contents of which are herein incorporated by reference for all purposes.

BACKGROUND

As an alternative to purchasing gifts at a retail store, many people purchase gift cards with a specific value for specific merchants (e.g., retailer, online store) to give as gifts to a recipient. Giving gift cards is convenient in that it saves a giver, a person wishing to give a gift to a recipient, time and effort to research and shop for a specific item that the giver believes the recipient would like. It may also avoid situations in which the recipient may not like or does not need the item given to them by the giver, and thus needs to return the item with the merchant for store credit. Gift cards can provide flexibility to the recipient to purchase whatever item they like from the issuing merchant.

However, there are still disadvantages and limitations in using gift cards. Since gift cards are issued by a specific merchant, the recipient is limited to using the gift card only at the issuing merchant. This is because when a giver purchases the gift card with a value of funds, the giver pays the value of funds on the gift card to the issuing merchant, and typical transaction processing occurs between the giver and the issuing merchant. Thus the recipient of the gift card is bound to use the funds on the gift card only at the issuing merchant since the issuing merchant has already received payment for the value of the gift card. The issuing merchant may be a retail store that the recipient does not frequent and it may be troublesome for the recipient to purchase items at the issuing retailer for the sake of using the gift card. For example, the store may be inconvenient for the recipient to get to, or may not have items that are useful to the recipient.

There are some services available that allow a gift card recipient to exchange the gift card for a gift card at another merchant, however, this requires a cumbersome process for exchanging the gift cards. For example, recipient of a first gift card may need to go to a website, enter information about the first gift card, select a new merchant gift card from the gift cards available, mail the first gift card to the service provider and then wait to receive the new gift card. Moreover, there may be limited merchants to choose from for the gift card exchange.

Another problem is that closed systems operated by merchants can generally have unsophisticated fraud detection systems. For example, some small to medium sized merchants may not have the resources or the expertise to implement meaningful or effective fraud detection systems.

Embodiments of the invention address these and other problems, individually and collectively.

BRIEF SUMMARY

It would be advantageous for a recipient to use a gift card issued by a specific merchant to conveniently use funds on the gift card at another merchant of the recipient's choice. Embodiments of the invention relate to improved methods of processing prepaid cards (e.g., gift cards) issued by merchants using closed system connections that can communicate through a payment processing network. Embodiments of the invention allow a consumer having a prepaid card issued by a first merchant to use the prepaid card at a second merchant.

In one embodiment of the invention, a method is described. The method comprises receiving at a server computer, an authorization request message from a first merchant computer operated by a first merchant that includes information associated with a transaction conducted by a consumer using a prepaid device associated with a second merchant, determining, based on the information in the authorization request message, the second merchant associated with the prepaid device, transmitting the authorization request message to a second merchant computer operated by the second merchant, receiving an authorization response message from the second merchant computer, and sending the authorization response message to the first merchant computer.

In another embodiment of the invention, a method is described. The method comprises electronically receiving transaction data for a transaction conducted by a user at a first merchant with an associated first merchant identifier, wherein the transaction data includes a payment amount and the first merchant identifier, electronically receiving data associated with a prepaid device issued by a second merchant with an associated second merchant identifier, wherein the prepaid device stores prepaid device data including a prepaid device account identifier associated with a prepaid device account with the second merchant and the second merchant identifier, transmitting an authorization request message including the transaction data and prepaid device data to a payment processing network, and receiving an authorization response message from the payment processing network.

In another embodiment of the invention, a method is described. The method comprises receiving, at a server computer associated with a second merchant, an authorization request message requesting authorization for a consumer to use a prepaid device associated with the second merchant for a transaction at a first merchant, determining whether to approve or deny the transaction based on transaction information included in the authorization request message, and transmitting an authorization response message that indicates the transaction is approved.

These and other embodiments are described in further detail below.

DETAILED DESCRIPTION

Embodiments of the invention relate to improved methods of processing prepaid cards (e.g., gift cards) issued by merchants using closed system connections that can communicate through a payment processing network. Embodiments of the invention allow a consumer having a prepaid card issued by a first merchant to use the prepaid card at a second merchant.

For example, prior to the occurrence of a gift card transaction, the payment processing network may establish protocol with each issuing merchant to be able to process the transaction. Typically prepaid cards (e.g., gift cards) are "closed loop" devices. Closed loop devices can typically only be redeemed by the issuing merchant. For example, a gift card for Macy's can only be redeemed at Macy's. In embodiments of the invention, the payment processing network may assign a merchant identification number (e.g., merchant identifier) that can be used similar to a bank identification number (BIN) used for traditional credit and debit transactions. Traditionally a payment processing network communicates with an issuer of a credit card or debit card, which is typically a bank. Embodiments of the invention allow for the payment processing network to communicate with an issuing merchant of a prepaid card regarding a transaction at a second merchant (e.g., transaction merchant) utilizing message formats traditionally used for credit and debit card transactions. Thus, embodiments of the invention allow processing of prepaid cards (e.g., gift cards) issued by merchants using closed systems connections, to communicate through the payment processing network. The payment processing network may be part of an open loop system that acts as a transaction switch between a plurality of different acquirers and a plurality of different issuers. This allows for a more secure system since the payment processing network can utilize the secure channels used for credit and debit card processing. This also allows for a more efficient system because a new system does not need to be established for communicating between closed loop systems.

A consumer that wishes to use a gift card issued by a first merchant, at a second merchant (e.g., transaction merchant), may do so by interacting with an access device at the transaction merchant or a merchant website running on a merchant server or an application running on a consumer device in communication with a merchant server. Access devices and merchant servers may be examples of merchant computers. In some embodiments, the merchant computer may generate and send an authorization request message that may include data relevant to the transaction. The payment processing network may receive the authorization request message and determine an issuing merchant identifier and optionally surcharge rules and conversion rules based on the issuing merchant identifier and other information included in the authorization request message. The payment processing network may re-format the authorization request message to include any applicable surcharge rules and conversion rules and send the re-formatted authorization request message to the issuing merchant computer (an example of a second merchant computer) operated by the issuing merchant to approve of the transaction. The issuing merchant may determine whether to approve the transaction and then generate and send an authorization response message back to the transaction merchant computer.

In some embodiments, a notification may be sent to a communication device operated by the consumer, so that the consumer can accept or reject any applicable surcharge fees and/or conversion amounts. If the consumer accepts the applicable surcharge fees and/or conversion amounts, the transaction is completed and the account associated with the prepaid card (e.g., gift card) is updated accordingly.

In other embodiments, surcharge fees need not be applied to the transaction when the transaction is conducted. For example, in one embodiment, a gift card issued by a second merchant may be used at a first merchant by a consumer. If the gift card is worth $100, the consumer may conduct a purchase transaction to buy $100 worth of goods and services from the first merchant using the gift card issued by the second merchant. In one embodiment, a surcharge fee need not be applied to the transaction at all or at any time, because the first and second merchants could have a cooperative agreement not to charge any fees for the use of their gift cards at each other's stores. In another example, a gross fee could be paid from one merchant to the other depending upon a gross sales volume over a period of time. For example, within one month, it may be determined that $10,000 worth of purchases were made at a first merchant using a gift card issued by the second merchant. Rather than charging a per transaction surcharge fee to any one party in the transaction, the second merchant may pay the first merchant a sum of money (e.g., 3%) based on the total sales volume for the month.

Prior to discussing the specific embodiments of the invention, a further description of some terms can be provided for a better understanding of embodiments of the invention.

A "merchant" may be an entity providing goods or services to consumers. Merchants may issue prepaid cards, such as gift cards, with a pre-determined value of funds on the issued card for use only at the issuing merchant. A merchant may operate a website offering goods and services, and/or may have a physical store at a location. Merchants may also operate access devices to communicate with other entities, such as acquirers, issuers, and payment processing networks, to process transactions conducted by a consumer with the merchant. In embodiments of the invention, a merchant may be an issuing merchant, issuing a prepaid card (e.g., gift card) to be used by a consumer, and another merchant may be a transaction merchant, conducting a transaction with the consumer. A merchant may be both an issuing merchant and a transaction merchant, or they may be separate merchants.

A "transaction" may include any suitable interaction that involves the movement of funds between entities, such as moving funds from a consumer to a merchant or service provider in exchange for goods or services, or moving funds from one merchant to another. Examples may include, but are not limited to, purchasing items in-person at a retail store, ordering items from a website online, paying for a meal at a restaurant, and/or calling a salon for salon services. A transaction may be identified by a transaction identifier, which may be any suitable mechanism for identifying the transaction.

"Transaction data" may include data showing the items to be purchased, information related to the items to be purchased, or payment amount information (e.g., currency, total or subtotal, tax, and/or shipping). Transaction data may include any data so that when an authorization request message is sent to an entity (e.g., issuer, payment processing network) for an authorization, the entity can communicate with other entities (e.g., acquirer, payment processing network, merchant) about the transaction and to facilitate the transaction. Transaction data may include a merchant identifier (e.g., MID) of the merchant in which the user is conducting a transaction with, a merchant category code (MCC), a merchant and/or access device identifier (e.g., a unique identifier for a point of sale (POS) terminal or for mobile internet session related URL), a transaction identifier, an identifier for merchant's acquirer or acquirer processor details (e.g., URL), a user identifier (e.g., a unique identifier for the user conducting the transaction at the merchant), and/or other information that is relevant to the transaction.

An "access device" may include any device that can be used for a consumer and a merchant to interact and make a sale/purchase. For example, an access device may be a device located on the premises of a merchant, such as any type of device traditionally used for a card present (CP) transaction (e.g., point of sale (POS) terminal). Examples of access devices include a point of sale (POS) terminal, an electronic cash register (ECR), a kiosk, an automated teller machine (ATM), etc.

A "prepaid device" may be in any suitable form. For example, suitable prepaid devices can be hand-held and compact so that they can fit into a consumer's wallet and/or pocket (e.g., pocket-sized). Prepaid devices may include smart cards with an integrated chip, cards with a magnetic stripe (e.g., debit cards or gift cards), keychain devices (such as the Speedpass™ commercially available from Exxon-Mobil Corp.), etc. Other examples of prepaid devices include cellular phones, personal digital assistants (PDAs), pagers, payment cards, gift cards, security cards, access cards, smart media, transponders, stored valued devices, debit devices, and the like. The prepaid device may be associated with a prepaid account with the issuing merchant, for example, a gift card to Macy's will be associated with a gift card account at Macy's. The prepaid device may also store information, such as prepaid card data. In some embodiments, a prepaid device may also be an account identifier (e.g., an account number) for a prepaid account. For example, the prepaid device from a second merchant may simply be a prepaid account number that is specifically issued by the second merchant to conduct payment transactions under normal circumstances.

A "prepaid account" may include any suitable account in which value is present or can be provided. A prepaid account may be associated with the prepaid device with a predetermined value of funds with the issuing merchant in a form of currency. The value of the prepaid account may have a predetermined amount in which at least one transaction can be conducted, and a transaction amount decreased from the predetermined amount to update a current value. In some embodiments, value of a prepaid account may be increased, however the value is still pre-determined and any one transaction conducted with the prepaid account cannot exceed the current value of the prepaid account.

A "prepaid account identifier" may include any suitable mechanism for identifying a prepaid account. It can be a combination of letters, numbers, or both, and of any length, that is correlated with the prepaid account.

"Prepaid card data" may include data relating to the prepaid account, such as the associated prepaid account identifier, and merchant ID of the merchant issuing the associated prepaid device. This data may be stored, encrypted, or encoded on the prepaid device, such as in a magnetic stripe, transponder, barcode, or integrated chip. The data may be electronically read from the prepaid device at an access device with a card reader, scanner, receiver, or other suitable device. Additionally, such data may be printed or embossed on the prepaid device.

An "authorization request message" may be a message that includes transaction data and prepaid card data. The authorization request message may include, for example, a merchant ID for a merchant which a user is conducting a transaction with (e.g., a transaction merchant), a payment amount for the transaction, a prepaid account identifier associated with a prepaid account and a prepaid device issued by an issuing merchant presented by the user, and a merchant ID for the issuing merchant. The authorization request message may also include a transaction identifier. An authorization request message according to an embodiment of the invention may comply with ISO 8583, which is a standard for systems that exchange electronic transactions made by cardholders using payment cards, or other electronic data interchange formats. The authorization request message may also comprise information such as an expiration date, a service code, and verification values such as dynamic and/or static card verification values.

"Surcharge rules" may include rules used to determine additional fees based on transaction data and/or prepaid card (or account) data. Surcharge rules may be stored on, or determined by, the access device, the payment processing network or a server computer associated with a merchant. Surcharge rules may also be based on affiliations or relationships with various merchants, and may be subject to conditions of the transaction, or prepaid account. These conditions or rules may be defined by the issuing merchant, the merchant conducting the transaction, payment processing network, and/or any other entity. For example, a surcharge rule may be for the user to pay the issuing merchant a fee to use funds from the prepaid account associated with the prepaid device at a non-issuing merchant. In another example a surcharge rule may be that a user may not be charged any fee and the issuing merchant and/or non-issuing merchant may pay a fee.

"Conversion rules" may include currency conversion. For example, a consumer may want to use a gift card from a first merchant that was purchased in Mexican pesos at a second merchant based in the United States. Conversion rules may include the currency conversion rate (e.g., for the day) between different types of currency (e.g., between Mexican pesos and U.S. dollars). The currency conversion rate may be determined during the authorization process. For example, the currency conversion rate may be used to determine how much money is available in the prepaid account and if there is enough money to cover the transaction. The currency conversion rate may also be used during clearing and settlement to determine the amount of funds to transfer between parties. For example the payment processing network may determine based on the transaction merchant a particular transaction currency (e.g., dollars). The payment processing network may then determine based in the issuing merchant identification the currency associated with the prepaid account. If these two currencies are not the same (e.g., transaction is in dollars and prepaid account is in pesos), then the payment processing network may determine a conversion rate between the two currencies and the actual amount available in the transacting currency for the prepaid account (e.g., the prepaid account amount in pesos converted to dollars). In some embodiments there may be a distinction between a transacting currency and a settlement currency. For example, in some counties the transactions may be conducted in local currency (e.g., because it is a country where the currency fluctuates a lot), and then there may be a separate settlement currency.

Conversion rules may also include conversion between different types of prepaid account values. For example, a consumer may want to use his prepaid card from a first merchant that includes a first type of value (e.g., 200 minutes of call time) to buy goods or services at a second merchant using a second type of value (e.g., dollars). Accordingly, conversion rules may be used to determine the conversion between minutes and dollars (e.g., 1 minute equals 0.10 dollars). Conversion rules may be determined based on an agreement between entities (e.g., an inoperability agreement) for a conversion rate that determines how many units of one type of prepaid account value is equal to another type of prepaid account value.

Conversion rules may be stored on, and/or determined by, a server computer associated with a payment processing network, merchant, etc. For example, a payment processing network may comprise a conversion table module that contains conversion rules. A payment processing network may use the merchant identification or other information included in an authorization request message or authorization response message to determine the associated conversion rules for that merchant and/or transaction. Conversion rules may be subject to conditions of the transaction, or prepaid account, and/or based on an agreement between two or more entities. Conversion rules may be used in the transaction authorization process and may be used in the clearance and settlement process.

An "authorization response message" may be a message that includes an indication that a transaction is authorized or denied. For example, an authorization response message may be a message that includes an indication from the issuing merchant that there are sufficient funds in the prepaid account to complete the transaction, including the application of any surcharge rules. An authorization response message may include applicable surcharge rules, the merchant ID for the issuing merchant of the prepaid account and prepaid device, the merchant ID of the merchant conducting the transaction, and other transaction details.

An "issuer" may refer to a financial institution, such as a bank, that creates and maintains financial accounts for account holders. An issuer or issuing bank may issue and maintain financial accounts for consumers. The issuer of a particular consumer account may determine whether or not to approve or deny specific transactions. An issuer may authenticate a consumer and release funds to an acquirer if transactions are approved (e.g., a consumer's account has sufficient available balance and meets other criteria for authorization or authentication).

An "acquirer" may refer to a financial institution associated with a merchant. Acquirers typically provide merchants with a bank account, and in some cases, transaction accepting infrastructure. Generally, after a transaction has been authorized and as part of the settlement process, funds are transferred from the issuer to merchant's account at the acquirer. Acquirer may also communicate payment transaction status with the merchant.

A "payment processing network" may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. Authorization, settlement, and clearing may be done at the same time (substantially simultaneously, e.g., within a few minutes or hours) or may be done as part of a batch settlement process (e.g., at the end of the day or week). The payment processing network may use any suitable wired or wireless network, including the internet.

A "server computer" can be a powerful computer or a cluster of computers. For example, the server computer can be a large mainframe, a minicomputer cluster, or a group of servers functioning as a unit. In one example, the server computer may be a database server coupled to a Web server and may host a merchant website. The server computer may use any suitable wired or wireless network, including the internet.

A "consumer device" may comprise any electronic device that may be operated by a user, which may also provide remote communications capabilities with a network. For example, a consumer device may be a personal computer (PC) of a consumer, a mobile device of a consumer, etc. A consumer device may be used by a consumer to communicate with a merchant, for example, through a merchant website or via an application running on the consumer device that is associated with the merchant. A consumer device may be an access device.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. A mobile device may comprise any suitable hardware and software for performing such functions, and may also include multiple devices or components (e.g., when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device.

System Overview

Figure 1:
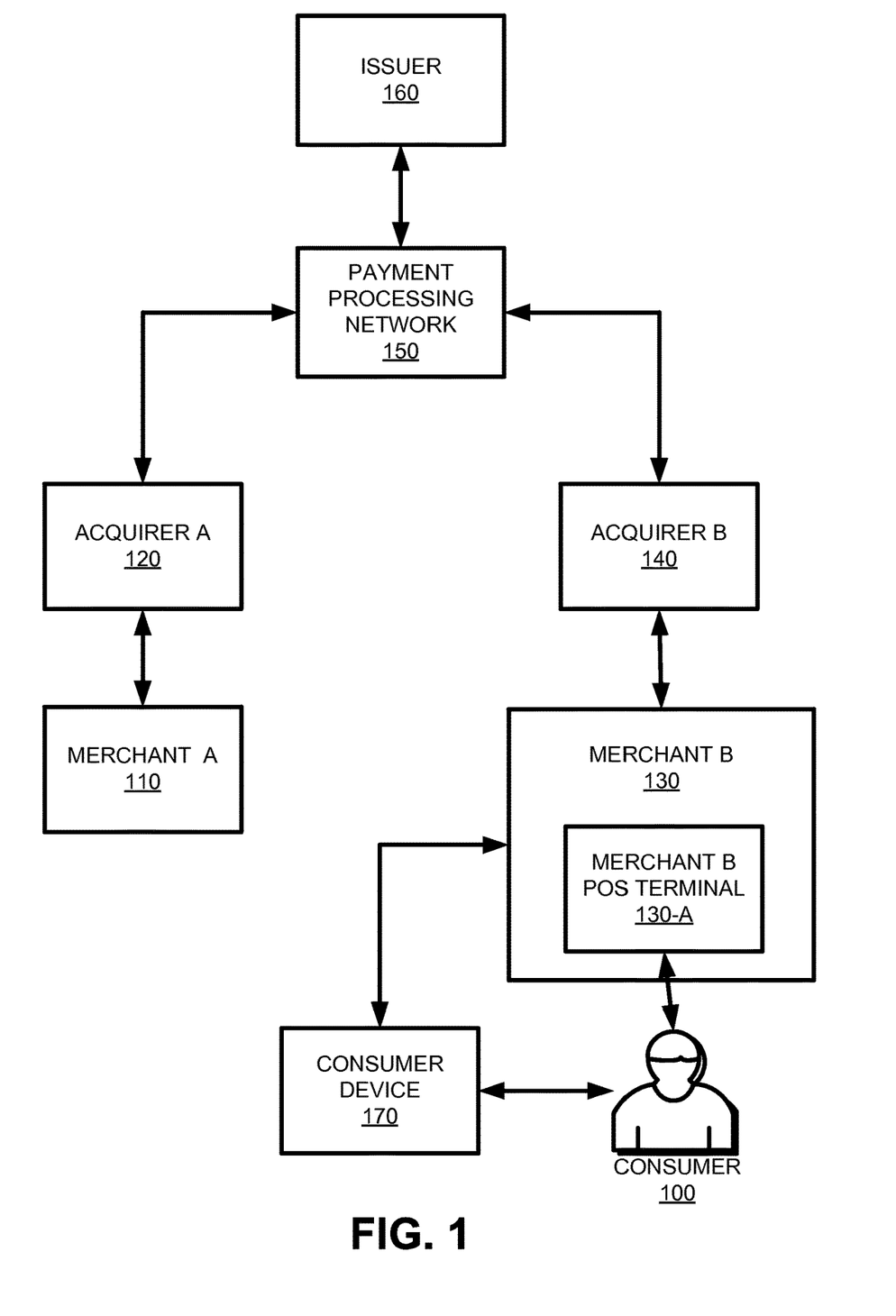
FIG. 1 shows an exemplary system overview according to an embodiment of the invention.

According to an embodiment of the invention, a recipient of a gift card (e.g., consumer) may have a gift card issued by a merchant. However, the consumer may wish to use the gift card at another merchant that is not the merchant that originally issued the gift card. FIG. 1 shows an exemplary system overview according to an embodiment of the invention in which the consumer may use the gift card at a merchant other than the issuing merchant. Although gift cards are described in detail, embodiments of the invention are not limited to gift cards. For example, embodiments of the invention could use any other type of prepaid mechanism or account. Other embodiments of the invention also need not be limited to prepaid accounts or devices. For example, embodiments of the invention can include the use of a credit card issued by first merchant in a closed loop system, at a second merchant that is outside of the closed loop system. As in the prepaid card example, such merchants may communicate via an open loop system such as the payment processing network described herein.

For simplicity of illustration, a specific number of entities are shown in FIG. 1. It is understood that embodiments of the invention may have more or less entities.

FIG. 1 shows an issuer 160, a first acquirer A 120, a second acquirer B 140, a first merchant A 110, and a second merchant B 130, each being operatively coupled to a payment processing network 150. Each of the issuer 160, the first acquirer A 120, the second acquirer B 140, the first merchant A 110, and the second merchant B 130, may operate an issuer computer, a first acquirer computer, a second acquirer computer, a first merchant computer, and a second merchant computer, respectively. The second merchant B 130 may operate an access device (e.g., POS terminal 130-A). A consumer 100 may interact with a merchant using a prepaid device which may be used to interact with the POS terminal 130-A. A consumer may operate a consumer device 170, which may be used to interact with the merchant B via a merchant website running on a merchant server or application running on the consumer device in communication with a merchant server. The components in FIG. 1 can communicate via any suitable communication medium, using any suitable communication protocol.

In some embodiments acquirer A 120 may be optional and the payment processing network 150 may be in direct contact with a merchant (e.g., merchant A 110).

In FIG. 1, a consumer 100 may have a gift card issued by an issuing merchant, merchant A 110, such as Applebee's, with a pre-determined value (e.g., a $100 gift card). However, the consumer 100 may wish to conduct a transaction at a transaction merchant, merchant B 130, such as Macy's, and may wish to use the gift card issued by merchant A 110 (e.g., Applebee's gift card) at merchant B 130 (e.g., Macy's).

The consumer 100 may interact with an access device, such as a point-of-sale (POS) terminal 130-A, at the transaction merchant, merchant B 130. For example, the merchant B POS terminal may have a card reader and the consumer 100 may swipe or scan the gift card at the merchant B POS terminal 130-A so that prepaid card (e.g., gift card) data on the gift card may be electronically read. In other embodiments, data may be transmitted via a wireless or contactless mode from the gift card to the merchant B POS terminal 130-A. In yet other embodiments the consumer 100 may interact with a merchant website or application associated with a merchant, using a consumer device 170 and may enter the prepaid card (e.g., gift card) data via the website or application. The prepaid card (e.g., gift card) data may include a current value of funds on the prepaid card (e.g., gift card), an issuing merchant (e.g., merchant A 110) identifier, a prepaid account identifier (e.g., gift card account identifier). In other embodiments, the funds associated with the prepaid card may be stored in accounts that are managed by a computer (not shown) operated by merchant A.

Merchant B 130 may then communicate with its associated acquirer B 140 with the data from the gift card issued by merchant A 110 by transmitting an authorization request message with transaction data from a merchant computer at merchant A 110 to an acquirer computer operated by acquirer B. The transaction data may include prepaid card data, a merchant B 130 identifier, a consumer 100 identifier, an amount for the transaction, and/or any other relevant data associated with the transaction. The authorization request message may be forwarded to a payment processing network 150, such as Visa.

Prior to the occurrence of a gift card transaction, the payment processing network 150 may establish protocol with each issuing merchant (e.g., merchant A 110, merchant B 130, etc.) to be able to process the transaction. Typically, prepaid cards (e.g., gift cards) are "closed loop" devices. Closed loop devices can typically only be redeemed at the issuing merchant. For example, a conventional gift card for Macy's can only be redeemed at Macy's. In embodiments of the invention, the payment processing network 150 may assign a merchant identification number that can be used similar to a bank identification number (BIN) used for traditional credit and debit transactions. Embodiments of the invention allow for the payment processing network to communicate with an issuing merchant of a prepaid card regarding a transaction at a second merchant (e.g., transaction merchant) utilizing message formats traditionally used for credit and debit card transactions, as well as an open loop payment processing network. This allows for a more secure payment systems since the payment processing network can utilize the secure channels used for conventional credit and debit card transactions.

Further, an open loop payment processing network can have advanced fraud detection systems that can determine whether or not fraud is present. In some embodiments, the payment processing network (or a server computer therein) may calculate a fraud score for the transaction being conducted and may insert this fraud score into the authorization request message that is sent to the first merchant computer operated by merchant A 110.

In embodiments of the invention, the merchant identification number may be a four to six digit number (for example) to map into existing messaging and routing formats as traditional credit and debit transactions. The merchant identification number may be used to identify which merchant or entity issued the gift card, and thus, where to route the authorization request message for authorization.

Prior to the occurrence of a gift card transaction, the payment processing network 150 may also establish protocol with each issuing merchant (e.g., merchant A 110, merchant B 130) on how the issuing merchant's transactions are to be authorized. In some cases, such as when the transaction amount is below a certain threshold value (e.g., less than $25), the payment processing network 150 may authorize the transaction based on information that it has about the consumer's account without consulting the issuing merchant. The payment processing network 150 may accept liability if the transaction turns out to be fraudulent. In other cases, such as when the transaction amount is above a threshold value, the payment processing network will forward the transaction information on to the issuing merchant for verification and authorization.

In addition, the payment processing network 150 may establish protocol with each issuing merchant (e.g., merchant A 110, merchant B 130) for conversion rules. As described in further detail above, conversion rules may include currency conversion and a currency type.

The payment processing network 150 may determine the merchant identification number for the issuer merchant of the gift card. For example, the payment processing network 150 may determine that the merchant identification number is associated with merchant A (e.g., Applebee's). The payment processing network 150 may transmit the authorization request message via acquirer A 120 to merchant A 110. In the alternative, the payment processing network 150 may transmit the authorization request directly to merchant A 110 without using an acquirer. Surcharge rules may be determined and applied based on the transaction data, which may be determined by the merchant A 110, the acquirer A, and/or payment processing network 150, individually or in conjunction with each other.

As part of the authorization process, the payment processing network may provide fraud checking mechanisms on behalf of the issuing merchant. For example, the payment processing network may verify a printed card verification value (e.g., CVV) which is stored at the payment processing network or issuing merchant. The card verification value may be printed on the gift card and sent along as part of the transaction information to the payment processing network.

When the issuing merchant (e.g., merchant A) approves of the transaction, an authorization response message may be transmitted from merchant A 10, to acquirer A 120 (optional), to the payment processing network 150, to the acquirer B 140, and to the merchant B POS terminal 130-A.

Figure 2:
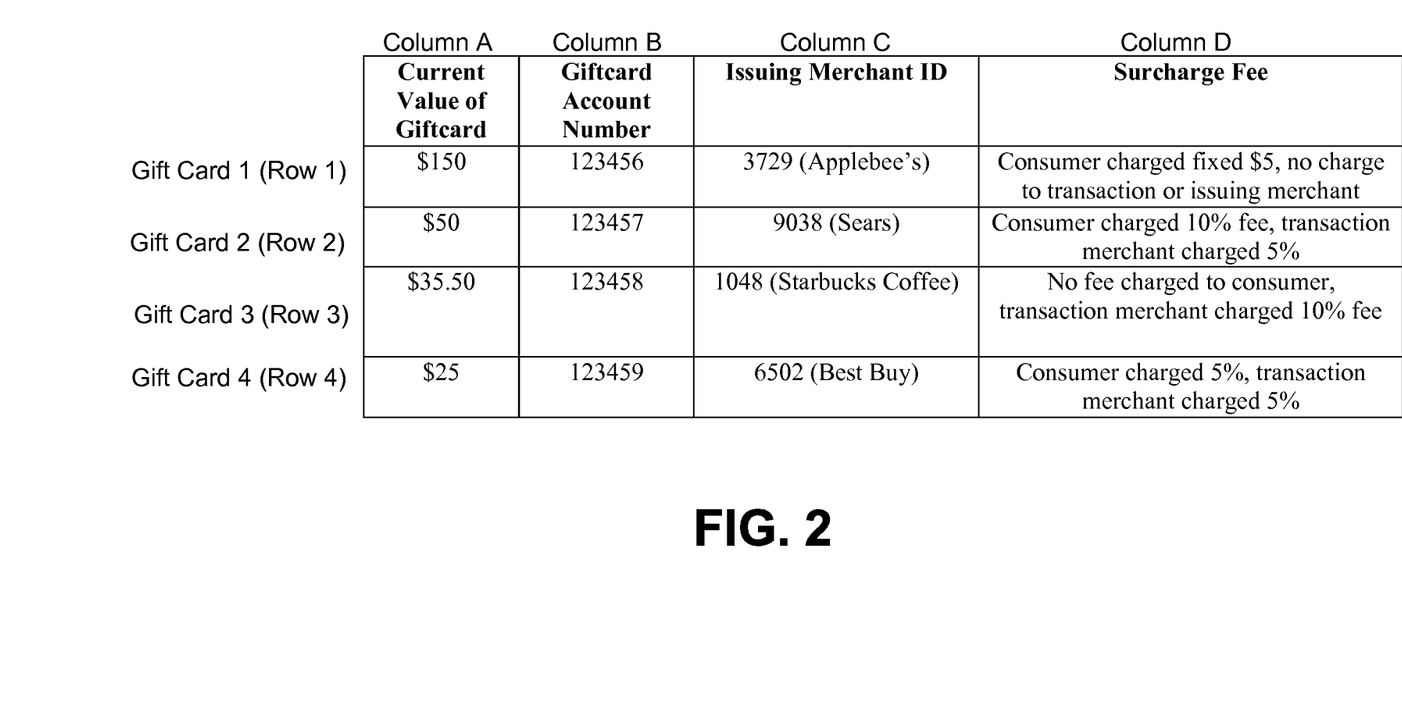
FIG. 2 shows an exemplary parameter table according to an embodiment of the invention.

If they are used, the surcharge rules may be stored in a database and determined by using a lookup table, data table, or other algorithm. The database may be associated with a payment processing network, merchant, acquirer, etc. The surcharge rules may be stored in a database associated with more than one entity. An exemplary data table is shown in FIG. 2. Each gift card may be represented by a row (Row 1-Row 4). Column A through Column D may represent different categories of data associated with the gift card. Column A contains data representing a current value on the gift card. In the exemplary system of FIG. 1, Column A may contain a value of $100 for the gift card of consumer 100. Column B contains data representing a gift card account number associated with the gift card. Column C may contain data representing an issuing merchant ID, for example, referring to the exemplary system in FIG. 1, merchant A 110. Column D may contain data representing surcharge rules for the issuing merchant. The surcharge rules may be based on other transaction data, such as an amount of the transaction.

For example, a Gift Card 1 may be represented by Row 1, having a current value of $150. Gift Card 1 in Row 1 may have a gift card account identifier, "123456," shown in Column B and be associated with an issuing merchant (e.g., Applebee's) with an issuing merchant identifier "3729" as shown in Column C. The consumer may be using gift card 1 issued by Applebee's at a transaction merchant (e.g., Macy's). The associated surcharge rules with Applebee's may be shown in Column D, Row 1, where the consumer is charged a fixed flat rate of $5, with no surcharge or additional fee charged to the transaction or issuing merchant. Other merchants, such as Sears, shown in Column C, Row 2, having an issuing merchant ID of "9038," may have surcharges where the consumer is charged 10% of the total amount, and the transaction merchant is charged 5% of the total amount (Column D, Row 2). Thus, for example, in Row 2 with a gift card of $50, if an amount of the transaction at a transactional Merchant (e.g., Best Buy) was $10, the consumer would be charged an additional $1, and the transactional merchant would be charged $0.50. Therefore, the total amount deducted from the current value of the gift card in Row 2 would be $11 from the current value of $50. Then the updated current value of $39 would replace $50 in Column A, Row 2 for Gift Card 2.

In other embodiments, the surcharge may be completely the transaction merchant's responsibility, as in Column D, Row 3, where no fee is charged to the consumer, but the transaction merchant pays the issuing merchant a 10% fee. In another embodiment shown in Column D, Row 4, the consumer and transaction merchant each pay a surcharge fee of 5% of the total amount. There may be various combinations of surcharges, which may be fixed fees or percentages, dependent specific types of transactions, type of merchant, time of day, or any other transaction data.

FIG. 2 shows a table with specific surcharge rules associated with specific gift cards. In other embodiments, a central database at a payment processing network or other location can store surcharge rules that can apply for any gift card issued by the issuing merchant. For example, an issuing merchant may set a rule which indicates that all transactions merchants will pay the issuing merchant a transaction fee of 3% of transactions that is conducted by the transaction merchants.

If applicable, conversion rules may be stored in a database and determined using a look up table, data table, or other algorithm. The database may be associated with a payment processing network, merchant, acquirer, etc. The conversion rules may be stored in an database associated with more than one entity. A conversion rule may be associated with one or more entities. A conversion rule for a particular entity or transaction may be determined by using a merchant identifier and transaction information to determine whether any conversion rules apply.

Exemplary Methods

Figure 3:
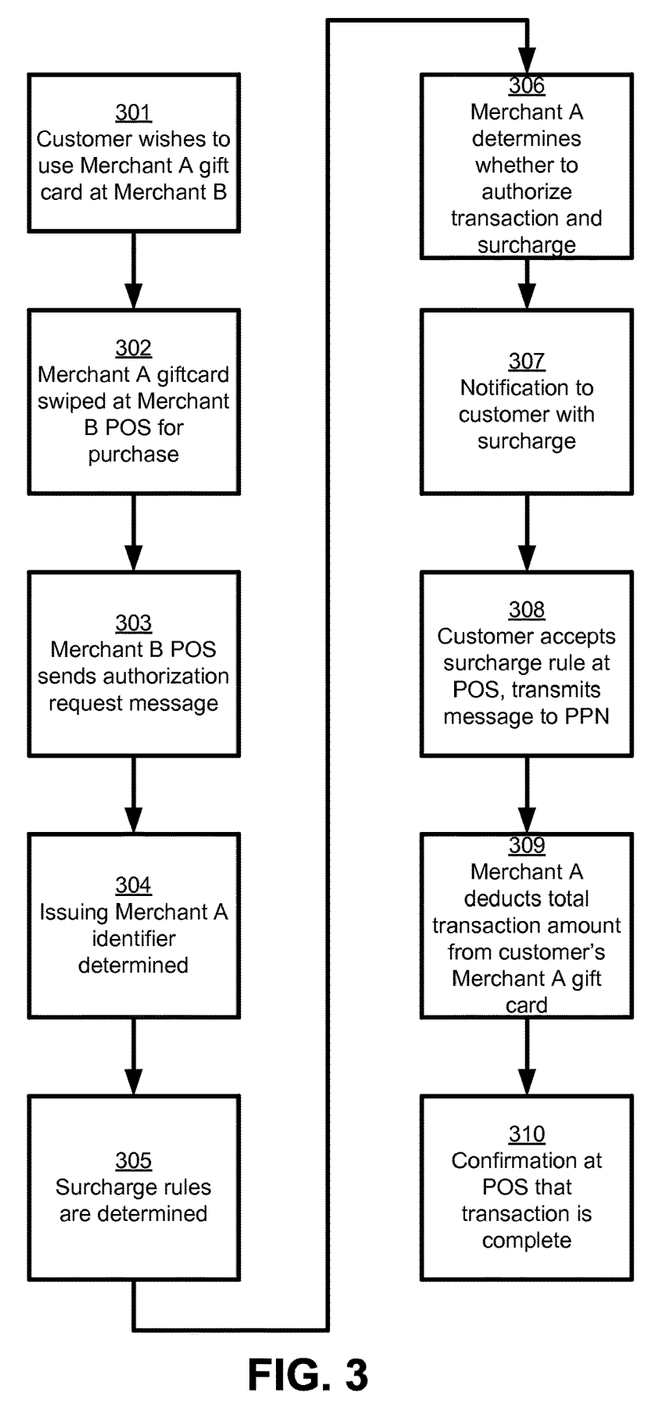
FIG. 3 illustrates an exemplary method flow according to an embodiment of the invention.

FIG. 3 shows a flowchart illustrating methods according to embodiments of the invention. Reference can be made to the system of FIG. 1. In the description below, reference is made to various entities including Acquirer A 120, Merchant A 110, etc. It is understood that each of these entities may operate computers and that messaging and/or data manipulation may be performed on such computers. For example, a description that a message that passes from Merchant B to Acquirer B may include a message that passes from Merchant B Computer to Acquirer B computer.

As shown in FIG. 1, a consumer 100 may have a gift card issued by an issuing merchant, merchant A 110, with a value of $100 in funds in a gift card account associated with the gift card. In step 301 of FIG. 3, the consumer 100 may wish to use the merchant A $100 gift card at a transaction merchant, merchant B 130. A transaction merchant may be a first merchant that the consumer interacts with, and an issuing merchant may be a second merchant.

In step 302 of FIG. 3, the merchant A $100 gift card may interact at an access device (e.g., POS terminal) at merchant B for a transaction totaling $20. The interaction may include swiping the gift card through a card reader on the POS terminal, scanning a barcode on the gift card, or manually entering printed prepaid data on the gift card into the POS terminal. In other embodiments, the gift card may be NFC-enabled or have an integrated chip, and may be able to communicate wirelessly with a receiver on the POS terminal by tapping the gift card, or holding the gift card in close proximity of the receiver.

The POS terminal 130-A may electronically receive and/or generate transaction data conducted by the consumer at merchant B (e.g., first merchant). Transaction data may include a transaction merchant identifier (e.g., merchant B identifier) or other prepaid card data, as well as a transaction amount (e.g., $20). Prepaid card data may be electronically read from the prepaid card (e.g., gift card) using the access device. The gift card may store prepaid card data, including a prepaid account identifier associated with a prepaid account and an issuing merchant identifier (e.g., merchant A identifier). The gift card may optionally store a current value of the prepaid account (e.g., $100) if the gift card has a volatile memory.

In step 303, the POS terminal 130-A of merchant B 130 may generate and transmit an authorization request message to the payment processing network 150 via acquirer B 140. The authorization request message may include the transaction data and prepaid card data. For example, the authorization request message may include the transaction merchant identifier (e.g., Merchant B identifier), the transaction amount (e.g., $20), the consumer identifier, the gift card account identifier, the current value of the gift card (e.g., $100), and the issuing merchant identifier (e.g., merchant A identifier). In other embodiments, transaction and/or prepaid card data may also include a transaction identifier, an access device identifier (e.g., a POS terminal identifier), or other relevant data associated with the transaction.

The payment processing network 150 receives the authorization request message. For example, the payment processing network 150 may receive the authorization request message at a server computer associated with the payment processing network. In step 304, the payment processing network may analyze the authorization request message to determine the issuing merchant identifier based on the transaction data and prepaid card data in the authorization request message and the transaction merchant identifier based on the transaction data and prepaid card data in the authorization request message.

Based on the determined issuing merchant identifier and/or other information in the authorization request message, the payment processing network 150 may determine the issuing merchant, the transaction currency, whether the issuing merchant identifier is an authorized issuing merchant identifier, where and how to route the authorization request message, the currency rate and currency type, etc. For example, the payment processing network 150 may use a look up table to determine routing instructions for the authorization request message, conversion rules, etc. and then apply any rules as required.

In step 305, surcharge rules are determined. The determination of the surcharge rules based on transaction and/or prepaid card data may be performed at the access device at merchant B and/or at the payment processing network and/or a server computer at merchant A. The surcharge rules may be determined based on the transaction merchant identifier and the issuing merchant identifier.

As described earlier in FIG. 2, a plurality of surcharge rules may be applied for different issuing and transaction merchants. The issuing and transaction merchants may or may not be affiliated with each other or have pre-determined contracts or business relationships with one another. For example, the issuing merchant may charge a flat fee of $5 to the consumer only, regardless of the transaction merchant and/or amount of the transaction. In other examples, the issuing merchant may charge only the transaction merchant a flat fee of $5. Or, both the consumer and the transaction merchant may share responsibility of the surcharge to the issuing merchant. Alternatively, the surcharge fee may be a percentage of the transaction amount, or a combination of a flat fee and a percentage (e.g., $5 for transactions up to $100 total, 5% for transactions over $100). In embodiments where the consumer and the transaction merchant share the cost of the surcharge fee to the issuing merchant, the share may be split evenly, the consumer may pay a larger portion, or the transaction merchant may pay a larger portion. In some embodiments, there may be no surcharge paid to the issuing merchant.

The surcharge rules may be determined by the issuing merchant (e.g., second merchant) and/or the transaction merchant (e.g., first merchant), and may be based on market or business factors, for example, the issuing merchant and the transaction merchant may not be direct competitors (e.g., issuing merchant is Macy's and transaction merchant is Applebee's), thus the surcharge may be only a flat fee of $5 paid to the issuing merchant (e.g., Macy's). If the transaction merchant is a direct competitor with the issuing merchant, for example if the transaction merchant is Bloomingdale's and the issuing merchant is Macy's, then the issuing merchant (e.g., Macy's) may charge a 25% surcharge to be paid to Macy's to discourage the consumer from using his or her Macy's gift card at a competing merchant such as Bloomingdale's. Other factors may include geographical location. For example, Macy's may discover that if consumers get coffee at a coffee shop (e.g., Starbucks) next to Macy's, the consumers can shop longer at Macy's, and therefore conduct more purchases at Macy's. Thus, Macy's may not charge any surcharge for consumers to use their Macy's gift cards at the Starbucks next to Macy's. In some embodiments, this may only apply to a Starbucks next to a Macy's and may not apply to any Starbucks at any location.

As described above, the payment processing network 150 may determine the issuing merchant (e.g., second merchant) using information in the authorization request message and then then transmit the authorization request message to merchant A (e.g., the second merchant) 110 via acquirer A 120. If the payment processing network 150 determined the surcharge rules, the payment processing network may modify or reformat the authorization request message to include the surcharge rules and any conversion rules and then send the modified authorization request message to merchant A 110, and merchant A 119 (e.g., the second merchant) may receive the authorization request message.

If the surcharge rules have not yet been determined or are not included in the authorization request message from the payment processing network, merchant A 110 may then determine whether any surcharge rules apply to the transaction. The merchant A 110 may determine whether any surcharge rules apply to the transaction based on information provide in the authorization request message (e.g., surcharge rules data included in the authorization request message from the payment processing network), or the merchant A 110 may determine any surcharge rules as described above. If the surcharge rules have been determined/are included in the authorization request message from the payment processing network 150, merchant A 110 may just verify that the surcharge rules are correct.

In step 306 merchant A 110 may determine whether to approve or deny the transaction based on transaction information included in the authorization request message and any surcharge rules or conversion rules that may apply (e.g., may determine whether there are sufficient funds in the account associated with the prepaid card to cover the transaction and any surcharge or conversion). For example, the issuing merchant, merchant A 110 (e.g., second merchant) may determine whether to authorize the use of the merchant A $100 gift card to pay for the $20 transaction at the transaction merchant, merchant B (e.g., first merchant), including the surcharge fee.

Merchant A 110 may then transmit an authorization response message to the payment processing network 150 indicating whether the transaction is approved or denied. The authorization response message may also indicate whether any surcharge rules apply and/or whether any conversion rules apply. The authorization response message may be sent by merchant A 119 via acquirer A 120 to the payment processing network 150. Existing fields in the authorization response message may be used to communication additional information related to surcharge rules and conversion rules or additional fields may be included in the authorization response message to communicate additional information related to surcharge rules and conversion rules. The additional fields may conform to industry accepted standard formatting to be compatible with existing payment systems.

The payment processing network 150 may then send the authorization response message to acquirer B 140 which may then send the authorization response message to merchant B 130. The authorization response message may be received by the access device (e.g., merchant B POS terminal 130-A) at merchant B 103.

In step 307, a notification may be transmitted to the consumer 100, indicating the surcharge rule(s) to be applied, and the total amount for the transaction, including the original transaction amount and the surcharge fee to merchant A 110, if applicable. The notification may include information about conversion rules, if applicable. The POS terminal 130-A of merchant B 130 may receive the notification from the payment processing network 150 (e.g., via an authorization response message sent through the acquirer B) and display the surcharge rules from merchant A 110 to be applied for the transaction with merchant B 130 to the consumer. For example, the POS terminal 130-A of merchant B 130 may display to the consumer 100 that a surcharge of $5 to be paid to merchant A 110 will be added onto the initial transaction amount of $20 for the transaction with merchant B 130, for a total of $25. In another example, POS terminal 130-A of merchant B 130 may display to the consumer 100 that a conversion of 100 minutes equals ten dollars towards the purchase transaction.

Figure 6A:
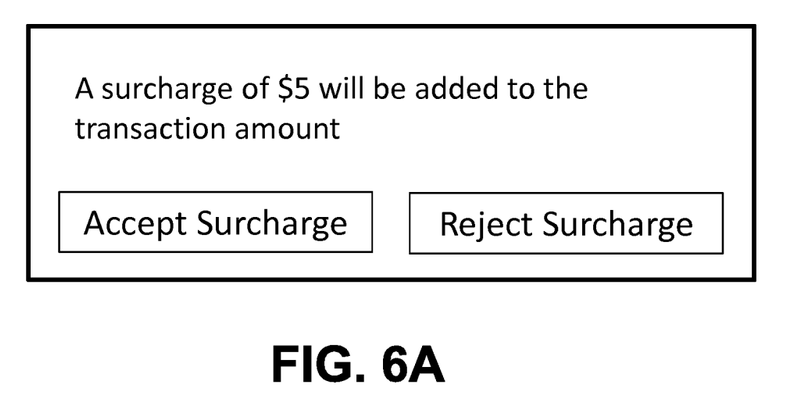
FIG. 6A and 6B each show an exemplary display of a mobile device.

Then in step 308, the consumer may elect to accept or reject the surcharge rule and/or conversion amount displayed at the POS terminal 130-A at merchant B 130. An exemplary display is shown in FIG. 6A. For example, the consumer may have the option to accept the $5 surcharge, and have a total of $25 to be deducted from his or her $100 gift card from merchant A, or reject and cancel the transaction. The POS terminal 130-A at merchant B 130 may receive an indication from the consumer 100 to accept the surcharge rules and proceed with the transaction with merchant B 130, including applicable surcharge fees paid to merchant A 110. The POS terminal 130-A at merchant B 130 may then forward this indication to the payment processing network 150 to apply the surcharge rules to the transaction.

In an alternative embodiment, a notification may be transmitted directly to the consumer, indicating the surcharge rule(s) to be applied, and the total amount for the transaction, including the original including the original transaction amount and the surcharge fee to merchant A 110, if applicable. For example, the payment processing network 150 may have contact information associated with a consumer 100 (e.g., that the consumer previously provided to the issuing merchant, transaction merchant, payment processing network, etc.). A mobile device (not shown) associated with the consumer (e.g., a mobile phone) may receive the notification from the payment processing network 150 and display the surcharge rules from merchant A 110 to be applied for the transaction with merchant B 130 to the consumer 100.

Figure 6B:
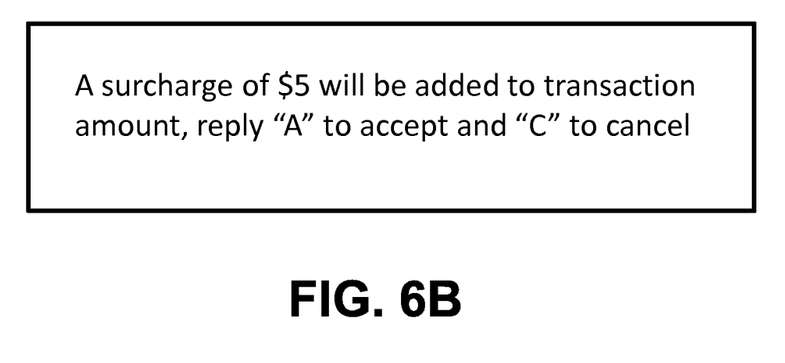

For example, the mobile device associated with the consumer may display to the consumer that a surcharge of $5 to be paid to merchant A will be added onto the initial transaction amount of $20 for the transaction with merchant B, for a total of $25. For example, the consumer could receive an SMS or MMS message via his mobile phone that indicates that a surcharge of $5 to be paid to merchant A 110 will be added onto the initial transaction amount of $20 for the transaction with merchant B 130, for a total of $25 or the consumer may receive the message via an application on his mobile device that displays the message with buttons to respond, etc. The consumer may then elect to accept or reject the surcharge rule displayed on his mobile device (e.g., by replying to the SMS/MMS message, tapping a button to respond, etc.). An exemplary display in shown in FIG. 6B.

The mobile device may transmit this indication to the payment processing network 150 to apply the surcharge rules to the transaction. For example, the consumer 100 may have the option to accept the $5 surcharge, and have a total of $25 to be deducted from his or her $100 gift card from merchant A, or reject and cancel the transaction. In this embodiment the POS terminal 130-A and/or merchant B 130 may have no knowledge of the notification to the consumer 100 and/or response by the consumer 100. This provides several advantages, for example, the POS terminal 130-A would not need any special knowledge or modification to process transactions using prepaid cards from other merchants. The transaction merchant (e.g., first merchant) may just accept and process the prepaid card like any other prepaid card or credit or debit card.

After receipt of the indication that the consumer 100 has accepted the surcharge rule, a total transaction amount may be calculated based on the original transaction amount (e.g., payment amount of $20 for transaction with merchant B), the surcharge rules (e.g., $5 flat fee paid to merchant A) and any conversion rules (e.g., currency conversion and/or currency type conversion), thus resulting in a total transaction amount of $25. This total transaction amount may be calculated by the payment processing network 150, merchant A 110, acquirer A 120, merchant B 140, etc.

An indication that the transaction is complete that may include the total transaction amount may then be sent to merchant A (e.g., an indication may be sent by merchant B and/or the payment processing network). In step 309 merchant A may then receive the message indicating the transaction has been completed and may deduct to total transaction amount (including any surcharge) from the account associated with the prepaid card. For example, merchant A may deduct $25 from the consumer's merchant A $100 gift card. The associated gift card account may be updated with a new current value of the remaining $75.

In an alternate embodiment, calculation and application of any surcharge rules may be done automatically without any consumer notification or requiring consumer approval or may only be displayed to the consumer if a surcharge is to be applied to the consumer.

In step 310, a confirmation from merchant A 110 (e.g., second merchant) may be transmitted to, and received at, merchant B's POS Terminal 130-A to indicate that the transaction with merchant B 130 (e.g., first merchant) is complete. In addition, or in the alternative, a confirmation from Merchant A 110 may be transmitted to the consumer and may be received at a mobile device associated with the consumer.

The above-described embodiments relate to an in store device present type of transaction. Other embodiments of the invention may be directed to card not present (e.g., e-commerce) types of transactions. In this case, the process flow may be somewhat similar to the one described above, except that the POS Terminal 130-A could be a merchant server, and the consumer 100 could communicate with the merchant server using a consumer device 170 (e.g., a client computer or mobile device that is connected to the merchant server via the Internet) via a website or application running on the consumer device 170.

At the end of the day, a normal clearing and settlement process can be conducted by the payment processing network. A clearing process is a process of exchanging funds between and acquirer and an issuer to facilitate posting to a consumer's account and reconciliation of the consumer's settlement position. Clearing and settlement can occur simultaneously.

In the embodiments described above, surcharge rules may be applied to the transactions to compensate an issuing merchant for the use of its payment devices with at a number of transaction merchants. Such transaction merchants would see the benefit of increased sales, and the issuing merchant would get paid for the use of its funds.

The payment of these surcharges from the transaction merchant to the issuing merchant may pass through the settlement and clearing process. That is, as money for a transaction passes from the issuing merchant to the transaction merchant during the settlement process, the surcharge fee may be deducted from the amount sent. For example, a $100 giftcard for an issuing merchant may be used at a transaction merchant to pay for a $100 item at the transaction merchant. During the authorization process, an authorization request message for $100 may be sent from the transaction merchant to the issuing merchant via the transaction merchant acquirer, the payment processing network, and optionally the issuing merchant acquirer (or directly to the issuing merchant without passing through an issuing merchant acquirer), and an authorization response message is returned to the transaction merchant through a similar path.

During the clearing and settlement process, the transaction merchant may send a file containing a number of transactions including the $100 transaction described above, to its acquirer, who may then forward it to the payment processing network. The payment processing network may then send instructions to the issuing merchant to forward an aggregate of funds that are owed to the transaction merchant. The aggregate of funds may include the $100 that it owes the transaction merchant, minus the agreed upon surcharge and taking into account and conversion rules. Assuming that the surcharge is 5%, only $95 would be transferred from the issuing merchant to the transaction merchant for the $100 transaction.

The above embodiments describe using one prepaid account (e.g., gift card) for a purchase transaction by a consumer. A consumer may also use a gift card for partial payment of the purchase transaction and be allowed to use other one or more additional forms of payment for the balance of the transaction (e.g., cash, another gift card, debit card, credit card, etc.). For example, the amount of the consumer's prepaid account may not be enough to cover the entire transaction. Accordingly the consumer may be given an option to pay the balance of the transaction with one or more other form of payment.

Exemplary Apparatuses

Figure 4:
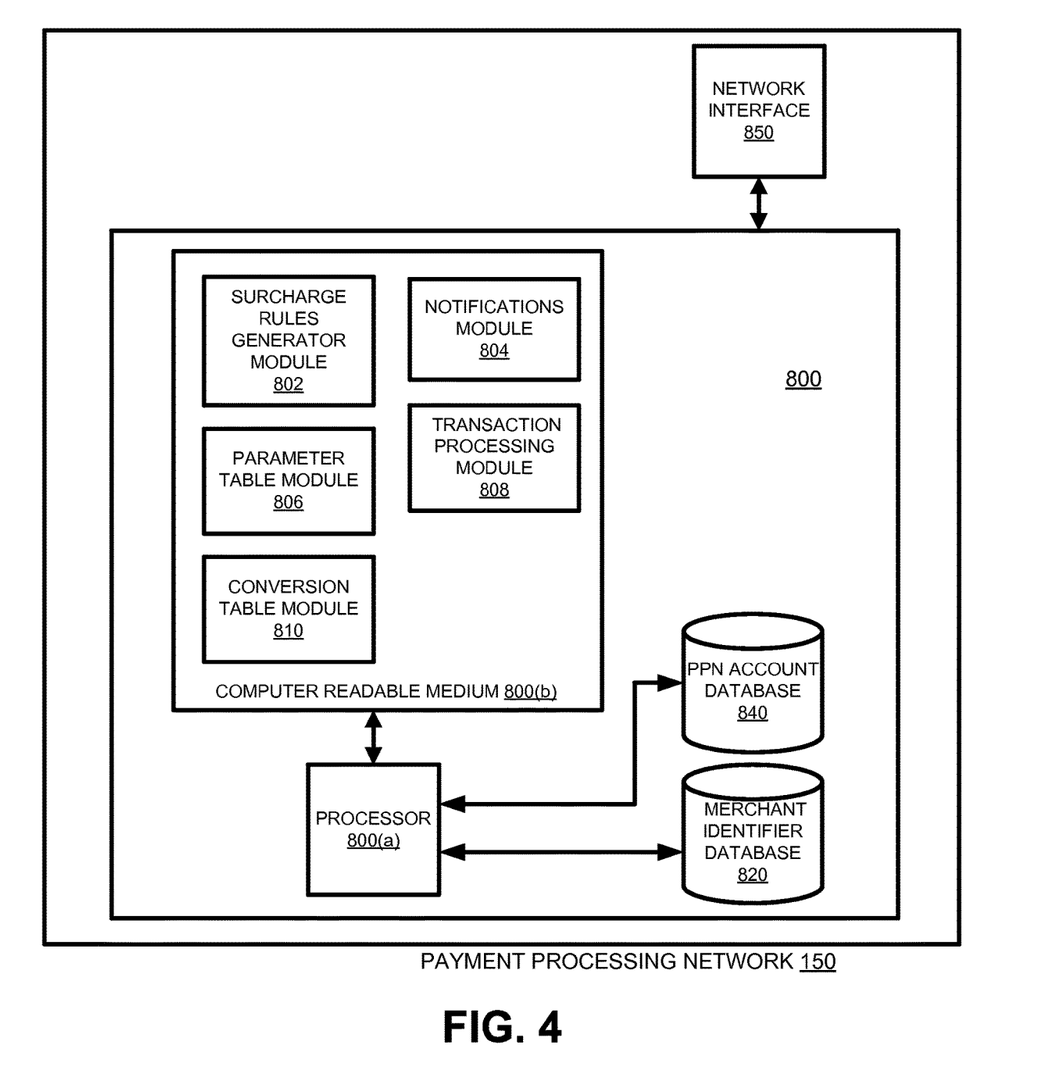
FIG. 4 shows an exemplary payment processing network server computer according to an embodiment of the invention.

An exemplary payment processing network 150 according to an embodiment of the invention is shown in FIG. 4. The payment processing network 150 (see FIG. 1) may include a server computer 800 comprising a processor 800(*a*), and a non-transitory computer readable medium 800(*b*). The server computer 800 may be coupled to external devices, such as a network interface 850 configured to communicate with an issuer 160, acquirers 140 (Acquirer B) and 120 (Acquirer A), consumers 100, and/or Merchant B POS Terminal 130-A.

The processor 800(a) may be coupled to an account database 840, comprising account identifiers associated with consumers and their respective consumer identifiers The processor 800(*a*) may also be coupled to a merchant identifier database 820, comprising merchant identifiers for transaction merchants (e.g., first merchants) and issuing merchants (e.g., second merchants). An associated consumer account identifier may be determined based on the consumer identifier by accessing and storing consumer identifiers and their respective associated account identifiers in account database 840. For example, a payment processing network, such as Visa, may identify and determine a PAN (primary account number) associated with the consumer, and this data may be stored in account database 840.

The processor 800(*a*) may be coupled to the computer readable medium 800(*b*) as well as have access to the account database 840 and merchant identifier database 820. The computer readable medium 800(*b*) may comprise software modules to use data accessed by the processor 800(*a*) from the account database 840 and merchant identifier database 820. Exemplary software modules in the computer readable medium 800(*b*) may include, but are not limited to, a surcharge rules generator module 802, a notifications module 804, a transaction processing module 808, a parameter module 808, and a conversion table module 810.

Figure 5:
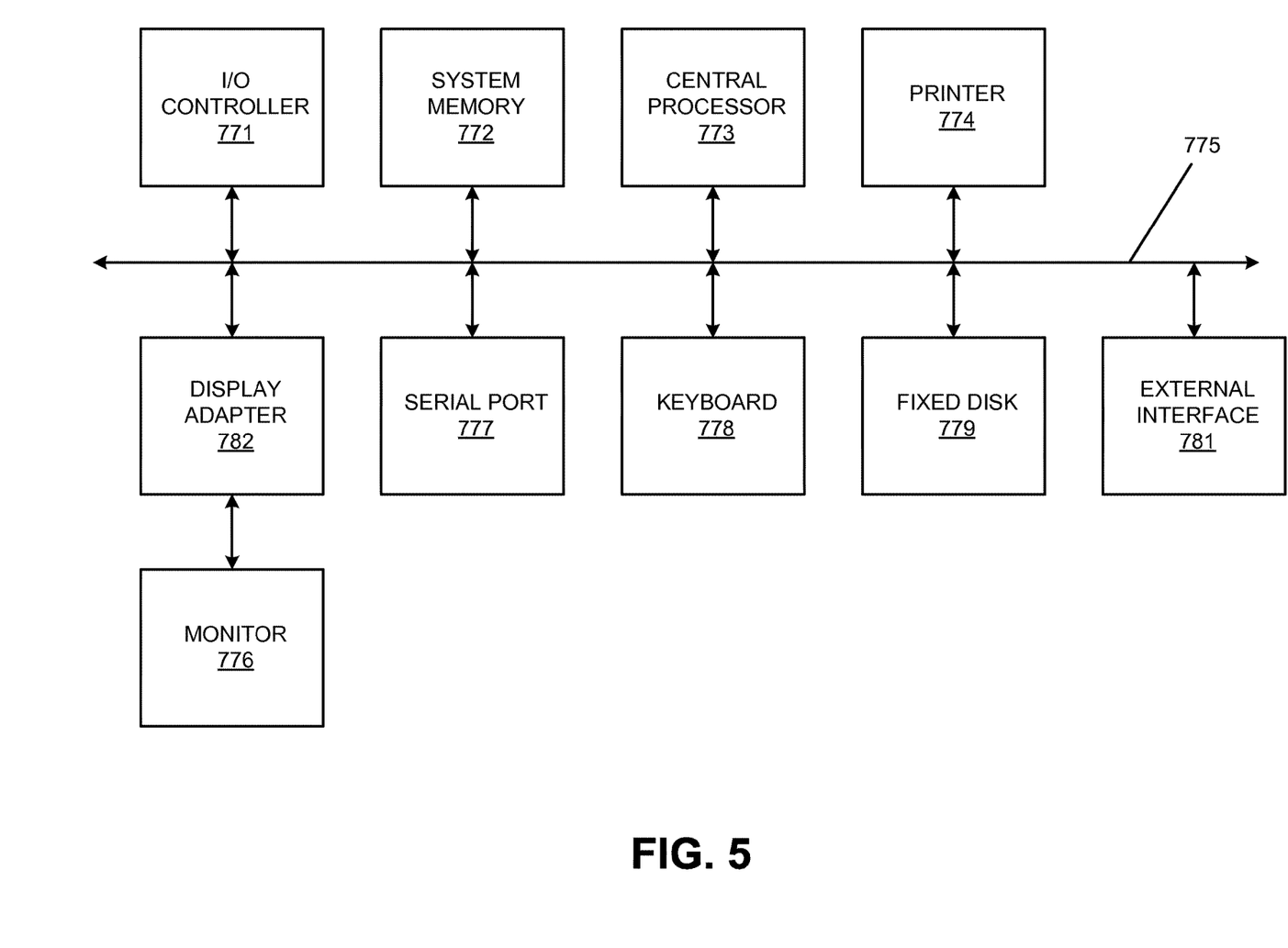
FIG. 5 shows an exemplary computer apparatus according to an embodiment of the invention.

Any of the entities described, including the merchant A, acquirer A 120, merchant B acquirer B 140, Issuer 160, merchant B POS terminal 130-A, consumer device 170 and the payment processing network 150 may utilize any suitable number of subsystems. Examples of such subsystems or components are shown in FIG. 5. The subsystems shown in FIG. 4 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer-readable medium.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
receiving, at a payment processing server computer, an authorization request message from a first merchant computer operated by a first merchant that includes information associated with a transaction being conducted by a consumer using a prepaid device;
determining, by the payment processing server computer, based on the information in the authorization request message, that the prepaid device is associated with an entity other than the first merchant;
determining, by the payment processing server computer, that the prepaid device is associated with a closed loop system operated by a second merchant, the first merchant being outside of the closed loop system, the prepaid device having an account balance maintained by the second merchant;
identifying, by the payment processing server computer, one or more surcharge rules to be associated with transactions that involve the first merchant and the second merchant;
adjusting, by the payment processing server computer, at least a transaction amount of the authorization request in the authorization request message based on the identified one or more surcharge rules;
reformatting, by the payment processing server computer, the authorization request message based on the identified one or more surcharge rules, the authorization request message reformatted from a first format used by the first merchant to a second format used by the second merchant;
transmitting, by the payment processing server computer, the authorization request message to a second merchant computer within the closed loop system operated by the second merchant for the second merchant to determine whether to approve the transaction being conducted by the consumer at the first merchant using the prepaid device associated with the second merchant, the second merchant determining whether to approve the transaction based at least in part on the account balance maintained by the second merchant computer and the transaction amount of the authorization request;
receiving, at the payment processing server computer, an authorization response message from the second merchant computer that includes an indication that the transaction being conducted by the consumer at the first merchant using the prepaid device associated with the second merchant is authorized or denied by the second merchant; and
sending, by the payment processing server computer, the authorization response message received from the second merchant, to the first merchant computer indicating that the transaction being conducted by the consumer at the first merchant using the prepaid device associated with the closed loop system operated by the second merchant is authorized or denied by the second merchant.

2. The method of claim 1 wherein the closed loop system operated by the second merchant is determined based on a merchant identifier associated with the prepaid device.

3. The method of claim 1 wherein the surcharge rules are determined by looking up the surcharge rules associated with the prepaid device in a database.

4. The method of claim 1 wherein the surcharge rules include charging the consumer a fee for the transaction.

5. The method of claim 1 wherein the surcharge rules include charging the first merchant a fee for the transaction.

6. The method of claim 1 wherein the surcharge rules include charging the second merchant a fee for the transaction.

7. The method of claim 1 wherein the surcharge rules are determined based on a first merchant identifier and a second merchant identifier using the information in the authorization request message.

8. The method of claim 1 further comprising:
receiving an indication to apply surcharge rules to the transaction.

9. The method of claim 1 further comprising:
transmitting a notification indicating information associated with the transaction including any surcharge rules applied to the transaction.

10. The method of claim 1 wherein the payment processing server computer is in a payment processing network configured to process credit card and debit card transactions.

11. A server computer comprising:
a processor; and
a computer readable medium coupled with the processor, the computer readable medium having executable instructions stored thereon, the executable instructions causing the server computer to:
receive an authorization request message from a first merchant computer operated by a first merchant that includes information associated with a transaction being conducted by a consumer using a prepaid device unassociated with the first merchant;
determine, based on the information in the authorization request message, that the prepaid device is associated with a closed loop system operated by a second merchant, the first merchant being outside of the closed loop system;
identify one or more rules to be associated with transactions that involve the first merchant and the second merchant;
adjust the authorization request message based on the identified one or more rules;
transmit the authorization request message to a second merchant computer within the closed loop system operated by the second merchant for the second merchant to determine whether to approve the transaction being conducted by the consumer at the first merchant using the prepaid device associated with the second merchant;
receive an authorization response message from the second merchant computer that includes an indication that the transaction being conducted by the consumer at the first merchant using the prepaid device associated with the closed loop system is authorized or denied by the second merchant; and
send the authorization response message received from the second merchant, to the first merchant computer indicating that the transaction being conducted by the consumer at the first merchant using the prepaid device associated with the second merchant is authorized or denied by the second merchant.

12. A method comprising:
electronically receiving, at a first merchant computer, transaction data for a transaction being conducted by a user at the first merchant with an associated first merchant identifier, wherein the transaction data includes a payment amount and the first merchant identifier;

electronically receiving, at the first merchant computer, data associated with a prepaid device issued by a second merchant with an associated second merchant identifier;

determining, based on the data associated with the prepaid device, that the prepaid device is associated with a closed loop system operated by the second merchant and unaffiliated with the first merchant, wherein the prepaid device stores prepaid device data including a prepaid device account identifier associated with a prepaid device account with the second merchant and the second merchant identifier;

transmitting, by the first merchant computer, an authorization request message including the transaction data and prepaid device data to a payment processing network, the payment processing network being caused to:

apply one or more rules specified by the second merchant computer to the authorization request message;

route the authorization request message to a second merchant computer associated with the second merchant to determine whether to approve the transaction being conducted by the consumer at the first merchant using the prepaid device associated with the second merchant; and receive, from the second merchant computer, a response to the authorization request message; and receiving, at the first merchant computer via the payment processing network, an authorization response message from the payment processing network that was received from the second merchant computer, the authorization response message indicating that the transaction being conducted by the consumer at the first merchant using the prepaid device issued by the second merchant is authorized or denied by the second merchant.

13. The method of claim 12 further comprising:
providing a notification to the user indicating surcharge rules to be applied to the transaction with the first merchant;
receiving an indication from the user to accept the surcharge rules and proceed with the transaction with the first merchant; and
transmitting the indication to the payment processing network to apply the surcharge rules to the transaction, thereby determining a total transaction amount based on the payment amount and the surcharge rules, wherein the total transaction amount is deducted from the prepaid device account associated with the second merchant.

14. The method of claim 12 further comprising:
receiving, from the payment processing network, surcharge rules based on the information in the authorization request message.

15. The method of claim 13, wherein the surcharge rules include a fee paid to the second merchant.

16. The method of claim 14, wherein the fee is paid by the first merchant.

17. A server computer comprising:
a processor; and
a computer readable medium coupled with the processor, the computer readable medium having executable instructions stored thereon, the executable instructions causing the server computer to:

electronically receive transaction data for a transaction being conducted by a user at a first merchant with an associated first merchant identifier, wherein the transaction data includes a payment amount and the first merchant identifier;

electronically receive payment data associated with a prepaid device unaffiliated with the first merchant;

determine that the prepaid device is associated with a closed loop system of a second merchant to which the first merchant does not belong based on an associated second merchant identifier, wherein the prepaid device stores prepaid device data including a prepaid device account identifier associated with a prepaid device account with the second merchant and the second merchant identifier;

identify one or more rules to be associated with transactions that involve the first merchant and the second merchant;

adjust the authorization request message based on the identified one or more rules;

transmit an authorization request message including the transaction data and prepaid device data to a payment processing network, the payment processing network supporting an open loop system to communicate between the server computer and the closed loop system of the second merchant, to send to the second merchant computer for the second merchant to determine whether to approve the transaction being conducted by the consumer at the first merchant using the prepaid device associated with the second merchant; and receive an authorization response message from the payment processing network that was received from the second merchant computer, the authorization response message indicating that the transaction being conducted by the consumer at the first merchant using the prepaid device issued by the second merchant is authorized or denied by the second merchant.

18. The method of claim 1 further comprising:
calculating a fraud score for the transaction; and
sending the fraud score in the authorization request message to the second merchant computer.

19. The method of claim 1 wherein the information in the authorization request message includes an amount of the transaction being conducted by the consumer.

20. The method of claim 19 wherein the second merchant determines whether to approve the transaction being conducted by the consumer at the first merchant using the prepaid device associated with the second merchant, based on the amount of the transaction.

21. The method of claim 10 wherein the server computer applies at least one fraud detection technique to the transaction being conducted by a consumer using the prepaid device, the at least one fraud detection technique being a technique applied to credit card and debit card transactions.

* * * * *

UNITED STATES PATENT AND TRADEMARK OFFICE
CERTIFICATE OF CORRECTION

PATENT NO. : 10,546,287 B2
APPLICATION NO. : 13/888873
DATED : January 28, 2020
INVENTOR(S) : Justin T. Monk It is certified that error appears in the above-identified patent and that said Letters Patent is hereby corrected as shown below:

In the Claims

In Column 21, Claim 16, Line 55 please remove "The method of claim 14" and insert -- The method of claim 15 --

Signed and Sealed this
Nineteenth Day of May, 2020

Andrei Iancu
*Director of the United States Patent and Trademark Office*